United States Patent
Pavlov et al.

(10) Patent No.: US 8,471,555 B2
(45) Date of Patent: Jun. 25, 2013

(54) METHOD FOR DETERMINING ORIENTATION OF ELECTROMAGNETIC RECEIVERS

(75) Inventors: Dmitriy A. Pavlov, The Woodlands, TX (US); Charlie Jing, Houston, TX (US); Dennis E. Willen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 302 days.

(21) Appl. No.: 13/120,596

(22) PCT Filed: Oct. 27, 2009

(86) PCT No.: PCT/US2009/062211
§ 371 (c)(1),
(2), (4) Date: Mar. 23, 2011

(87) PCT Pub. No.: WO2010/053753
PCT Pub. Date: May 14, 2010

(65) Prior Publication Data
US 2011/0193554 A1  Aug. 11, 2011

Related U.S. Application Data

(60) Provisional application No. 61/111,168, filed on Nov. 4, 2008.

(51) Int. Cl.
*G01B 7/30* (2006.01)
(52) U.S. Cl.
USPC ................... 324/207.25; 324/365
(58) Field of Classification Search
USPC ............... 324/207.25, 207.23, 365, 76.52
See application file for complete search history.

(56) References Cited

U.S. PATENT DOCUMENTS

| 4,617,518 | A | 10/1986 | Srnka |
| 7,792,766 | B2 | 9/2010 | Houck et al. |
| 2009/0171587 | A1* | 7/2009 | Lu .................................... 702/7 |

FOREIGN PATENT DOCUMENTS

| GB | 2 442 244 | 4/2008 |
| WO | WO 2007/018810 | 2/2007 |
| WO | WO 2007/102973 | 9/2007 |
| WO | WO 2007/136451 | 11/2007 |
| WO | WO 2008/024184 | 2/2008 |
| WO | WO 2008/032065 | 3/2008 |

OTHER PUBLICATIONS

Alumbaugh, D.L. et al. (1996), "Three-Dimensional Wideband Electromagnetic Modeling on Massively Parallel Computers," *Radio Sci.* 31, pp. 1-23.

(Continued)

*Primary Examiner* — Vincent Q Nguyen
(74) *Attorney, Agent, or Firm* — ExxonMobil Upstream Research Company Law Department (57) ABSTRACT

Method for determining receiver orientation angles in a controlled source electromagnetic survey, by analyzing the survey data. For a given survey receiver, two data subsets are selected. (43, 44). The two subsets may be from two offset ranges that are geometrically symmetrical relative to the receiver location. Alternatively, the second subset may be a computer simulation of actual survey data. In either instance, an orientation is assumed for the receiver (45), and that orientation is used to compare component data from the two subsets that can be expected to match if the assumed orientation angle(s) is (are) correct (46). The mismatch is ascertained, and the assumed orientation is adjusted (45) and the process is repeated.

15 Claims, 7 Drawing Sheets

OTHER PUBLICATIONS

Behrens, J.P. (2005), "The Detection of Electrical Anisotropy in 35 Ma Pacific Lithosphere: Results From a Marine Controlled-Source Electromagnetic Survey and Implications for Hydration of the Upper Mantle," University of California thesis, pp. 37-39, 86-93.

Constable et al. (1996), "Marine controlled-source electromagnetic sounding 2. The PEGASUS experiment," *Jour. Geophys. Res.* 101, pp. 5519-5530.

Davydycheva, S. et al. (2003), "An Efficient Finite-Difference Scheme for Electromagnetic Logging in 3D Anisotropic Inhomogeneous Media," *Geophysics* 68, pp. 1525-1536.

Egbert, G.D. (1997), "Robust Multiple Station Magnetotelluric Data Processing," *Geophys. J. Int.* 130, pp. 475-496.

Key, K.W. et al. (2006), Mapping 3D salt using the 2D marine magnetotelluric method: Case study from Gemini Prospect, Gulf of Mexico, *Geophysics* 71(1), pp. B17-B27.

Mittet, R. et al. (2004), E020, "Inversion of SBL Data Acquired in Shallow Waters," EAGE 66th Conference & Exhibition, Paris, France, 5 pgs.

Mittet, R. et al. (2007) "On the orientation and absolute phase of marine CSEM receivers," *Geophysics* 72, pp. F145-F155.

Zach, J.L. et al. (2008), "Preprocessing of Marine CSEM Data and Model Preparation for Frequency-domain 3D Inversion," PIERS Proceedings, Cambridge, XP-002559191, pp. 144-148.

*European Search Report*, dated Jan. 18, 2010, EP 09151952.

*International Search Report*, dated Dec. 23, 2009, PCT/US2009/062211.

\* cited by examiner

METHOD FOR DETERMINING ORIENTATION OF ELECTROMAGNETIC RECEIVERS

CROSS REFERENCE TO RELATED APPLICATIONS

This application is the National Stage of International Application No. PCT/US2009/062211, that published as WO 2010/05373, filed 27 Oct. 2009, which claims the benefit of U.S. Provisional Application No. 61/111,168, filed 4 Nov. 2008, each of which is incorporated herein by reference, in its entirety, for all purposes.

FIELD OF THE INVENTION

This invention relates generally to the field of geophysical prospecting and more particularly to the field of electromagnetic surveying. Specifically, the invention is a method of determining the orientation of receivers used in marine controlled-source electromagnetic data acquisition by matching one subset of data to another.

BACKGROUND OF THE INVENTION

Controlled-source electromagnetic ("CSEM") surveys are an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter signal frequency and separation (called offset) between transmitter and receiver can be diagnostic of rock properties associated with the presence or absence of hydrocarbons. Specifically, CSEM measurements are used to determine the spatially varying resistivity of the subsurface, and resistivity anomalies enable predictions to be made about the hydrocarbon potential of the subsurface region.

Figure 1:
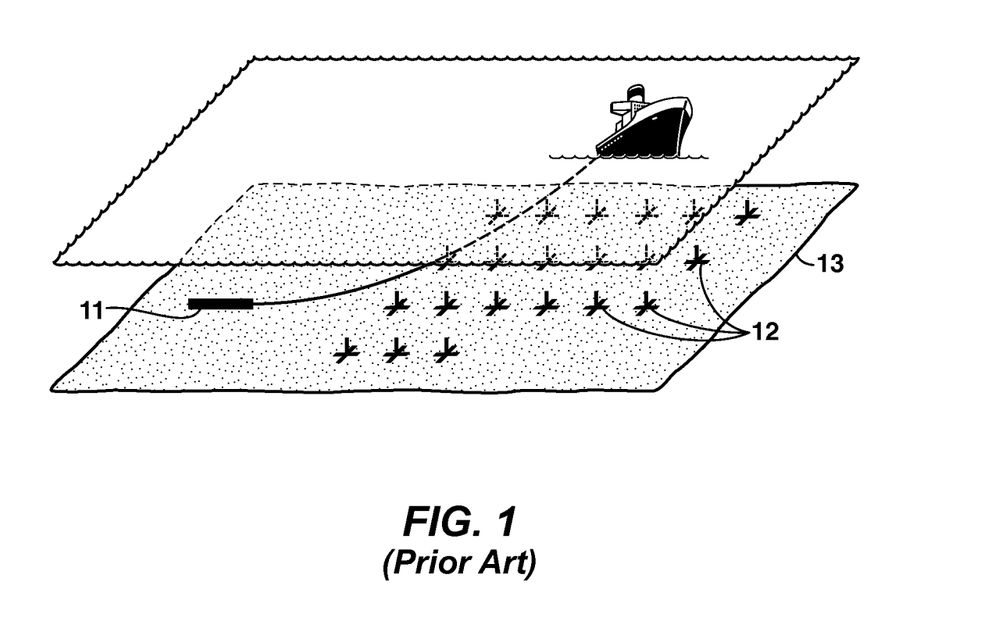
FIG. 1 is a depiction of a typical marine CSEM survey.

In the marine environment, CSEM data are typically acquired by towing an electric dipole transmitter antenna 11 among a number of receivers 12 positioned on the seafloor 13 (FIG. 1). The receivers are directional and usually have multiple sensors designed to record different vector components of the electric and/or magnetic fields. In typical applications, the receivers will have a minimum of two horizontal electric-field antennae. In addition, the receivers may have a vertical electric-field antenna and/or horizontal and vertical magnetic-field antennae. Alternative configurations include stationary transmitters on the seafloor or in the water column as well as magnetic transmitter antennae. "Offline" or "broadside" data refer to data acquired with the receiver displaced laterally from the tow line.

While alternative, towed configurations are known (see for example U.S. Pat. No. 4,617,518 to Srnka), the receivers most commonly used in CSEM surveys sink freely to the seafloor during the deployment. Knowledge of the actual orientation of the electromagnetic detectors on the seafloor is critical for proper interpretation and imaging of the CSEM data. Two types of approaches have been used to estimate these final orientations. One approach is to include a measurement system on the receivers, but these do not typically provide reliable information about the orientation of the receiver's electric and magnetic antennae. The other approach is processing-based techniques that use simplifying assumptions and provide only approximations to the receiver orientations. Receiver orientations have been previously analyzed by one or the other of these two approaches or combinations of both. Examples of each approach include:

Compass measurements: electronic or locking compasses installed on the receiver are used to measure the local direction of the earth's static magnetic field relative to the receiver antennae. These measurements are recorded and become accessible when the receiver is recovered after the survey is finished. (Key, et al., "Mapping 3D salt using the 2D marine magnetotelluric method: Case study from Gemini Prospect, Gulf of Mexico," Geophysics 71, B17-B27 (2006)). The inclination and declination of the static field are routinely mapped and published (http://www.ndgc.noaa.gov/geomag/geomag-.shtml). PCT Patent Application Publication WO 2007/136451 (Summerfield and Phillips) further refines receiver orientation measurements based on attitude sensors (such as compasses) by measuring the deviation of the electric and magnetic sensor positions from their nominal design positions relative to the receiver body.

Polarization analysis: See Constable and Cox, "Marine controlled-source electromagnetic sounding 2. The PEGASUS experiment," Jour. Geophys. Res. 101, 5519-5530 (1996); and Behrens, "The Detection of Electrical Anisotropy in 35 Ma Pacific Lithosphere: Results from a marine controlled-source electromagnetic survey and implications for hydration of the upper mantle," University of California thesis (2005). In a one-dimensional earth, the strongest horizontal electric field is parallel to the towed electric dipole source (inline electric field) while the strongest horizontal magnetic field is perpendicular to the towed source (crossline magnetic field). Maximizing the energy in these components gives an estimate of the receiver orientation relative to the tow line orientation. Mittet et al. (PCT Patent Application Publication WO 2008/032065; also "On the orientation and absolute phase of marine CSEM receivers," Geophysics 72, F145-F155 (2007)) also describe the polarization analysis method with the minor additions of weighting the electromagnetic data in the least-squares analysis and median filtering the predicted orientations for different source and receiver offsets.

Magnetotelluric data coherency and correlation between two receivers: This method (see Behrens, op. cit.) determines the relative rotation angle between two receivers using the background electromagnetic signals generated by the interaction of the solar wind and the ionosphere. Generalizations of this method (Egbert, "Robust multiple station magnetotelluric data processing," Geophys. J. Int. 130, 475-496 (1997)) improve upon receiver-by-receiver orientation analysis to determine best estimates for the orientations of a group of receivers.

Inversion: See Mittet et al., E020, "Inversion of SBL data acquired in shallow waters," EAGE 66th Conference & Exhibition—Paris, France, Jun. 7-10 (2004); and Lu, PCT Patent Application Publication WO2007/018810. Receiver azimuth and tilts are determined by inversion of measured EM data, either simultaneously with inversion for subsurface resistivity or based on a fixed resistivity model.

All of these methods have limitations. Compass measurements are subject to stray magnetic fields in the receivers and local errors in the static field measurements, and are not accurate enough for practical applications in subsurface hydrocarbon detections.

Polarization analysis requires that at least one towline must pass close to the receiver (online data). When used with online data, polarization analysis is a relatively robust method for extracting the maximum inline component of the electric field or crossline component of the magnetic field because these components depend on the cosine of the error in receiver orientation. For angular errors in the range of 5 to 10 degrees typical of polarization analysis, the cosine of the error will be off by less than 2%. Other data components, such as the crossline component of broadside data, will depend on the sine of the angular error, so that a 10 degree error will have a 17% impact on these components. Polarization analysis alone is therefore unsuitable to predict these more sensitive components. Orientations determined by this technique are furthermore subject to data limitation caused by receiver saturation (signals too large to be digitized), feathering of the CSEM source antenna, and breakdown of the one-dimensional earth approximation. Polarization analysis does not generalize to three dimensions to determine the tilt of vertical receiver antennae.

In order to find the receiver azimuth, magnetotelluric coherency requires the azimuth of the reference receiver be known. Success in using this method is dependent on whether high quality natural signals are recorded by both receivers. This method is even more strongly influenced by three-dimensional variation of the subsurface and is typically less accurate than polarization analysis. Like polarization analysis, magnetotelluric coherency does not generalize to determine the tilt of vertical receiver antennae;

Inversion can provide accurate results if the model of the earth resistivity is close enough to the reality. It is, however, computationally intensive because multiple solutions of the forward modeling problem (i.e., solving Maxwell's equations by numerical methods) are required and sensitive to errors introduced by local minima in the objective function from both the variation of receiver orientations and the subsurface resistivities.

Thus, an improved method for determining receiver orientation is needed, and the present invention satisfies this need.

SUMMARY OF THE INVENTION

The present invention is a method for determining the orientation of a directional electromagnetic receiver used in a controlled source electromagnetic survey from the electromagnetic field data measured by the receiver in the survey ("survey data"), said method comprising:

(a) selecting a first offset (source-receiver separation) range of said survey data;

(b) selecting a second offset range of directional electromagnetic data;

(c) assuming an angular orientation for the receiver relative to a selected coordinate reference frame;

(d) using the assumed angular orientation, resolving data from the first offset range and data from the second offset range into components in a common coordinate reference frame (the "projected components");

(e) comparing at least one projected component from the first offset range to a corresponding at least one projected component from the second offset range for degree of mismatch;

(f) adjusting the assumed angular orientation to reduce the degree of mismatch; and (g) repeating steps (c)-(g) until the degree of mismatch is reduced to less than a pre-selected tolerance or other stopping condition is met.

The second offset range of directional electromagnetic data in (b) may be a second offset range selected to be symmetric to the first offset range with respect to the receiver's location, with the "common coordinate reference frame" including inline and crossline axes. Alternatively, the second offset range of directional electromagnetic data in (b) may be the same as the first offset range, where the "electromagnetic data" in (b) is synthetic data generated to simulate the survey's conditions and in particular to generate synthetic data for the receiver in the survey for the first offset range.

BRIEF DESCRIPTION OF THE DRAWINGS

The present invention and its advantages will be better understood by referring to the following detailed description and the attached drawings in which.

The invention will be described in connection with example embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present inventive method determines a receiver's orientation by matching different portions of electromagnetic data or by matching electromagnetic data to the same portion of synthetic data. If available, approximate receiver orientations derived from some method such as polarization analysis can be used as the initial guess for the current invention.

Conventional marine CSEM data sets consist of horizontal electric and magnetic field channels. In some implementations, vertical field measurements are available and can be used to analyze the receiver's tilt relative to the vertical direction by the present invention.

Figure 2A:
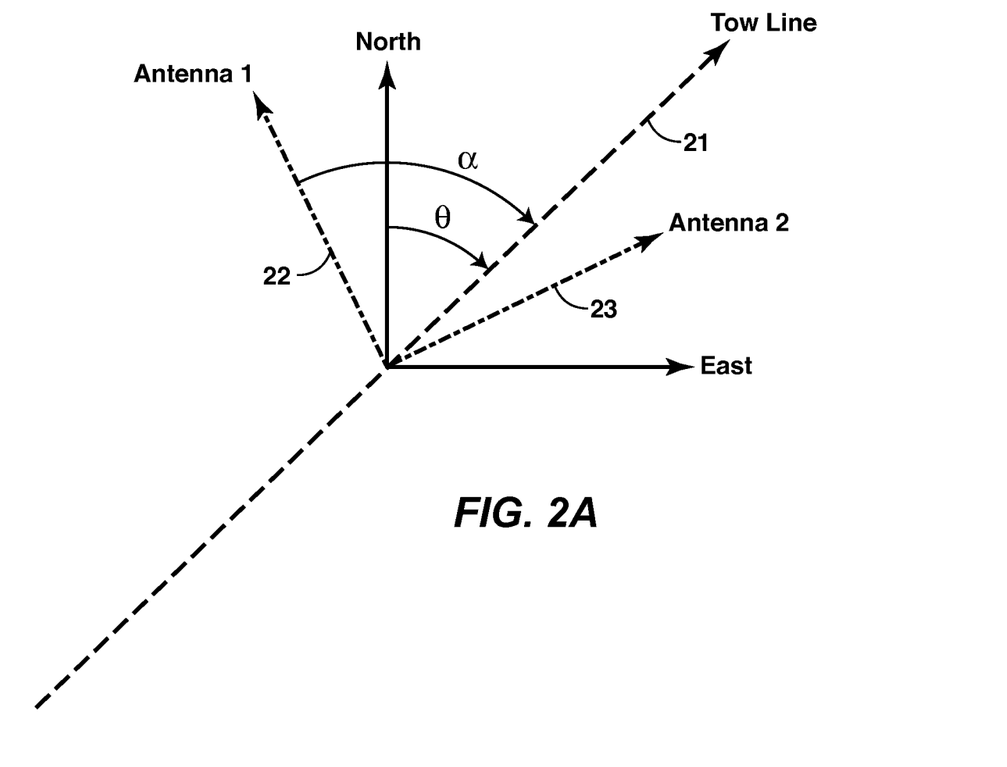
FIG. 2A shows the relative orientations of receiver antennae and tow line in two dimensions.

The situation in two dimensions is shown in FIG. 2A. The orientation θ of the tow line 21 relative to north is generally specified in advance of the survey and monitored continuously by the ship and source navigation systems. The receivers fall to the seafloor with some unknown orientation, θ−α, with respect to north. The decomposition of the receiver data into inline and crossline components is not dependent upon whether the receiver is directly beneath the tow line or laterally separated from it. If $E_1$ and $E_2$ represent the measured electric field components in the first and second receiver antennae (22 and 23), then the inline and crossline data components are given by $$E_{inline} = E_1 \cos(\alpha) + E_2 \sin(\alpha)$$

$$E_{crossline} = -E_1 \sin(\alpha) + E_2 \cos(\alpha) \quad (1)$$

Once $\alpha$ has been determined by, for example, polarization analysis or by the present invention, then the receiver orientation, $\theta - \alpha$, can be easily computed.

Figure 2B:
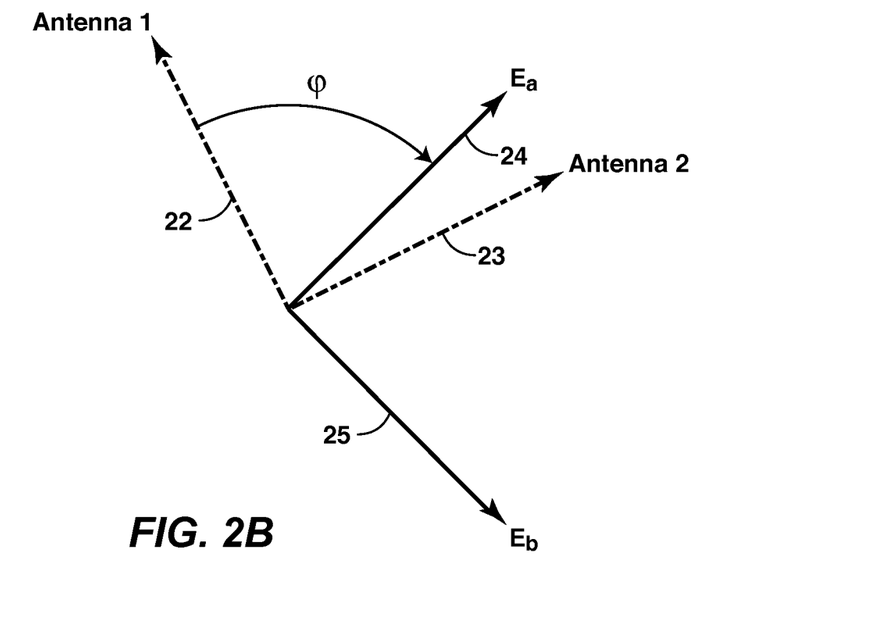
FIG. 2B shows the relative orientations of receiver antennae and antennae for forward modeling.

Similar formulae apply to the forward synthesis of electromagnetic data by the solution of Maxwell's equations (FIG. 2B). Again, if $E_1$ and $E_2$ represent the measured electric field components in the first and second receiver antennae (22 and 23), then synthetic electric field components $E_a$ and $E_b$ (24 and 25) are related by $$E_1 = E_a \cos(\phi) - E_b \sin(\phi)$$

$$E_2 = E_a \sin(\phi) + E_b \cos(\phi) \quad (2)$$

or by the inverse relationship $$E_a = E_1 \cos(\phi) + E_2 \sin(\phi)$$

$$E_b = -E_1 \sin(\phi) + E_2 \cos(\phi) \quad (3)$$

By means of these relationships, measured data components may be resolved along and perpendicular to both online and broadside tow lines and synthetic data components may be resolved along the directions of measured data components. In particular, it is possible to resolve two synthetic components along the direction of a single measured component, even when a second measured component is unavailable. In actual surveys, a second measured component may be rendered unusable by high noise levels or by an instrument malfunction.

Figure 3:
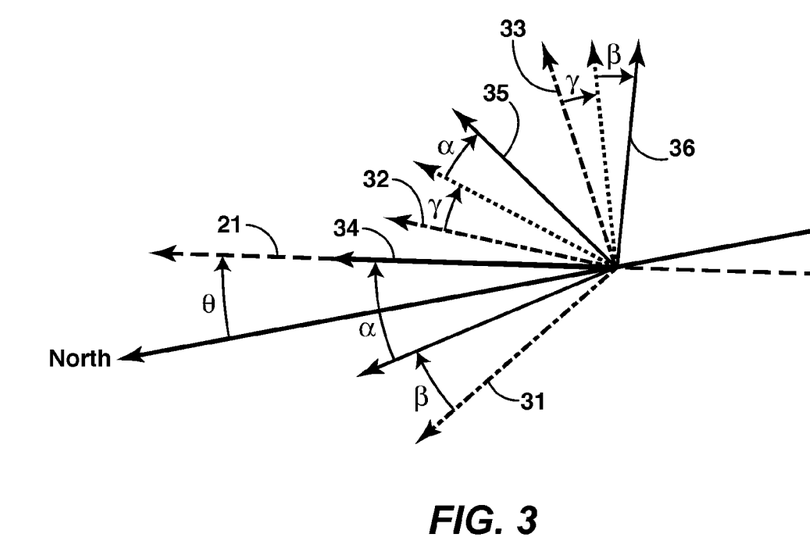
FIG. 3 shows the relative orientations of receiver antennae and tow line in three dimensions.

FIG. 3 shows the more complex, three-dimensional case. Different parameterizations are possible, but the receiver orientation will most generally be specified by three angles: $\alpha$, $\beta$, and $\gamma$. In addition to the two (notionally) horizontal receiver antennae 31 and 32, there is a notionally vertical antenna 33 with measured electric field component $E_3$. The angle $\gamma$ measures the dip of antenna 2 with respect to the horizontal plane, $\beta$ measures the dip of antenna 1 with respect to the horizontal and $\alpha$ measures the horizontal projection of antenna 1 with respect to the tow line. The inline (34), crossline (35), and vertical (36) data components are then given by $$E_{inline} = E_1 \cos(\alpha)\cos(\beta) + E_2[\sin(\alpha)\cos(\gamma) - \cos(\alpha)\sin(\beta)\sin(\gamma)] + \quad (4)$$
$$E_3[\sin(\alpha)\sin(\gamma) + \cos(\alpha)\sin(\beta)\cos(\gamma)]$$
$$E_{crossline} = -E_1 \sin(\alpha)\cos(\beta) + E_2[\cos(\alpha)\cos(\gamma) - \sin(\alpha)\sin(\beta)\sin(\gamma)] +$$
$$E_3[\cos(\alpha)\sin(\gamma) - \sin(\alpha)\sin(\beta)\cos(\gamma)]$$
$$E_{vertical} = -E_1 \sin(\beta) - E_2 \cos(\beta)\sin(\gamma) + E_3 \cos(\beta)\cos(\gamma)$$

These formulas also apply to magnetic field components and to synthetic electromagnetic data. The present invention applies equally well to either electric or magnetic data. Corresponding formulae relating synthetic data components to measured data components in three dimensions can be derived by the familiar methods of vector analysis.

In a one-dimensional earth, the inline, crossline, and vertical components of either online or offline data are symmetric in offset, with the center of symmetry being the point of minimal distance to the receiver. This symmetry is spoiled by any orientation error for the receiver, and this is an underlying realization for the present invention. Seafloor topography, resistivity variations in the horizontal directions, and source feathering can also spoil this symmetry. Data are least distorted for high signal-to-noise levels outside the saturation zones near the center of symmetry (perpendicular projection of the receiver position on to the tow line—see 57 in FIG. 5) and for towlines nearest to the receiver. Lower frequencies will be less distorted than higher frequencies. Inline electric and crossline magnetic components (towline directly over the receiver) depend on the cosine of the azimuth orientation, $\alpha$, and are therefore insensitive to errors below 5-10 degrees.

Figure 4:
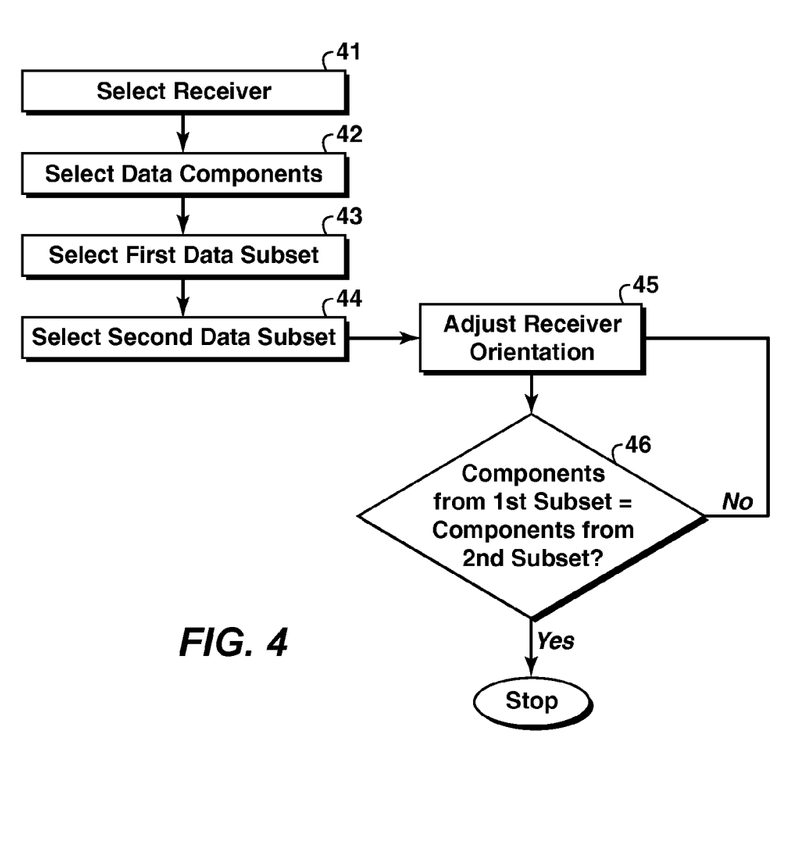
FIG. 4 is a flow chart showing basic steps in one embodiment of the present invention.
Figure 5:
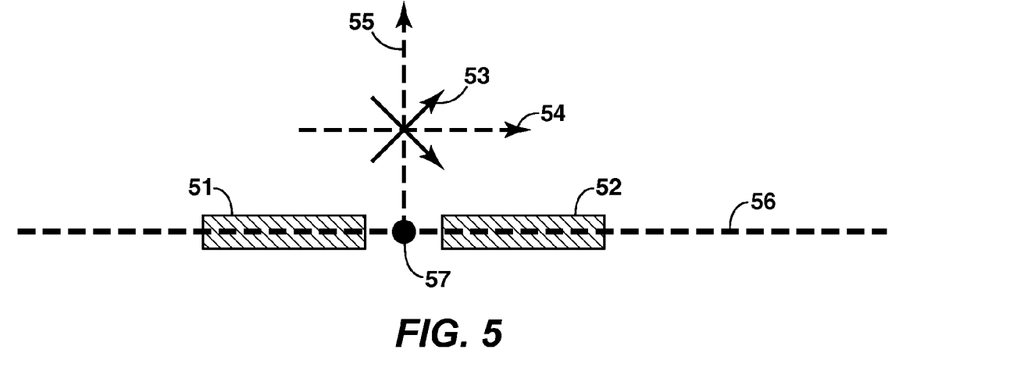
FIG. 5 is a schematic diagram indicating the symmetry and data matching aspects of the present inventive method.

An embodiment of the present inventive method is described in the flow chart of FIG. 4, with clarification from the schematic diagram of FIG. 5. An offline receiver 53 is shown in FIG. 5 with its horizontal antennas not aligned, as typically will be the case, with the inline (54) and (55) crossline directions relative to the tow line 56. For such a given receiver, one may consider the horizontal data components (inline and/or crossline) from the nearest broadside tow lines and the frequencies of good quality, as described next.

In a first embodiment of the invention, the symmetric offset ranges (subsets) of the data are selected (51 and 52), compared, and the receiver azimuth (the angle $\alpha$ in FIG. 2) is varied until the data subsets at the lowest available frequency are most symmetric on the selected data component (inline and/or crossline). Note that the selected data component is computed from the measured horizontal components using the receiver azimuth by means of equation (1). In three-dimensional problems, all three orientation angles are varied while the data symmetries are examined.

Figure 8A:
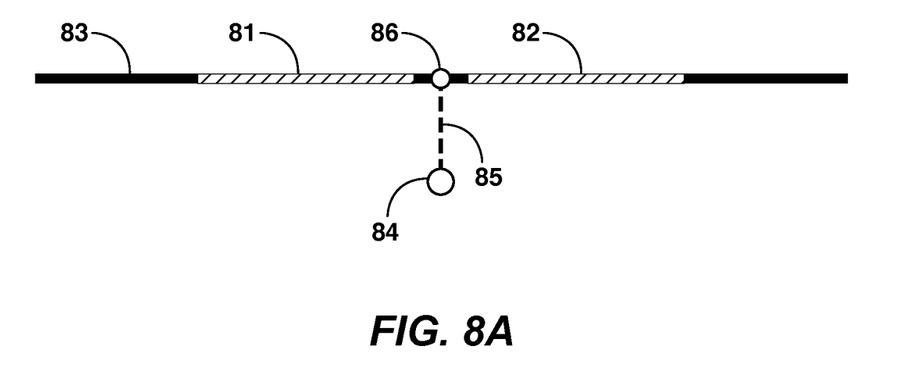
FIGS. 8A-B are schematic diagrams illustrating example symmetry conditions for a first embodiment of the present inventive method; and, FIG. 9 is a schematic diagram indicating the synthetic and measured data aspects of a second embodiment of the present inventive method.
Figure 8B:
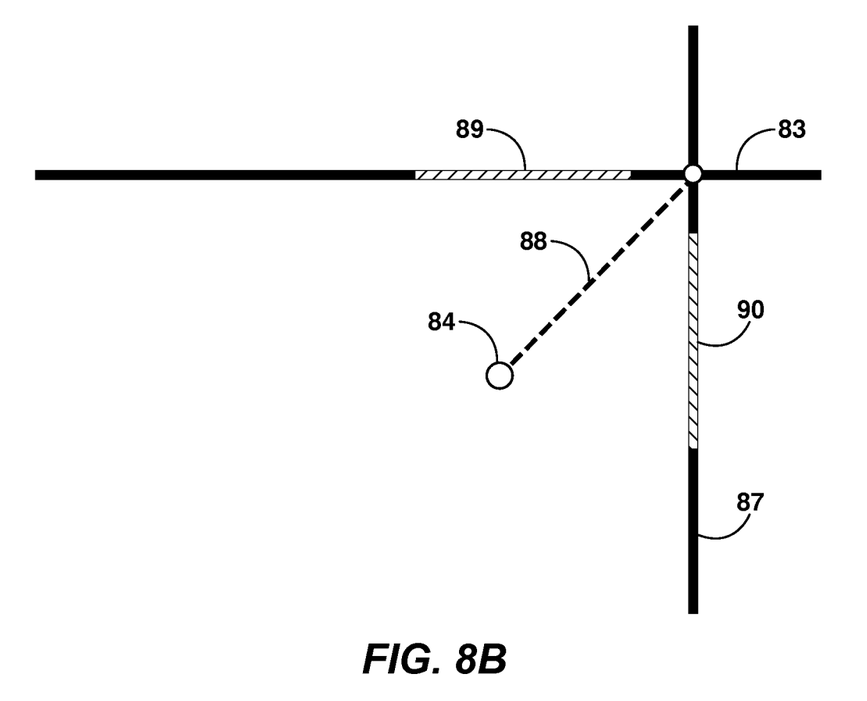

FIGS. 8A-B illustrate situations where symmetry considerations make data matching appropriate. FIG. 8A shows offset ranges 81 and 82 located on the same tow line symmetrically with respect to broadside receiver location 84 and to all other points on the perpendicular line 85 from that receiver to the tow line. Line 85 may be termed an axis of symmetry and point 86 a center of symmetry. Thus, data recorded at receiver 84 (or a receiver located anywhere else on axis of symmetry 85) for offset range 81 should match corresponding data from offset range 82 after being resolved into inline and crossline (and, optionally, vertical) components. Here, corresponding means same receiver, same data component and same relative location within the offset range. Note that the field components for symmetric source positions will not be expected to match when resolved into components along arbitrary (x,y) axes—such as the receiver's actual antenna directions. The inline and crossline axis directions have the symmetry required to make matching conditions. (In FIG. 8A, the crossline components should match and the inline components should match except for a sign difference.) Any mismatch is assumed to be primarily due to an incorrect assumption as to the value of receiver azimuth angle $\alpha$ which is required in order to resolve the measured field values into inline and crossline components—see equations (1) and (4). FIG. 8B illustrates a situation where symmetry exists between two source tow lines. As in FIG. 8A, receiver 84 is broadside of towline 83, but it is also broadside tow line 87. The axis of symmetry is now line 88 connecting the receiver (x,y) position to the (x,y) position of the intersection of the two tow lines. Thus, 89 and 90 are symmetric offset ranges. These two examples illustrate how symmetric offset ranges are selected in the present inventive method.

In a second embodiment of the invention, the first data subset is an offset range in the measured data and the second subset is a synthetic or forward-model data set in the same offset range. Here, the receiver orientation used to generate the synthetic data set is varied until the synthetic data (projected onto the receiver antennae of the update orientation) equals the measured data to within a pre-selected tolerance, or else another stopping condition for the iteration is reached.

The synthetic data set is generated by using a resistivity model that preferably includes all known geology features, such as bathymetry, salt bodies, and best estimate of the subsurface resistivity, and all available survey information, such as transmitter cable feathering and orientation, and solving Maxwell's equations for the electromagnetic fields in the earth. Only one forward simulation is needed for a given best estimate of conductivity model using an arbitrary initial receiver orientation. The synthetic data at any trial receiver orientation can be obtained by data rotation from the initial receiver orientation used in the forward simulation to the trial orientation. The numerical simulation of electromagnetic fields is well known in the CSEM field of technology. See, for example, Alumbaugh et al. "Three-dimensional wideband electromagnetic modeling on massively parallel computers," *Radio Sci.* 31, 1-23 (1996); Davydycheva et al., "An efficient finite-difference scheme for electromagnetic logging in 3D anisotropic inhomogeneous media," *Geophysics* 68, 1525-1536 (2003); and the COMSOL product, available from COMSOL Inc., 744 Cowper Street, Palo Alto, Calif., 94301. The principle of reciprocity may be used to decrease the computational cost of electromagnetic simulations; see PCT Patent Application Publication WO 2007/102973 (Carazzone and Clee).

Figure 9:
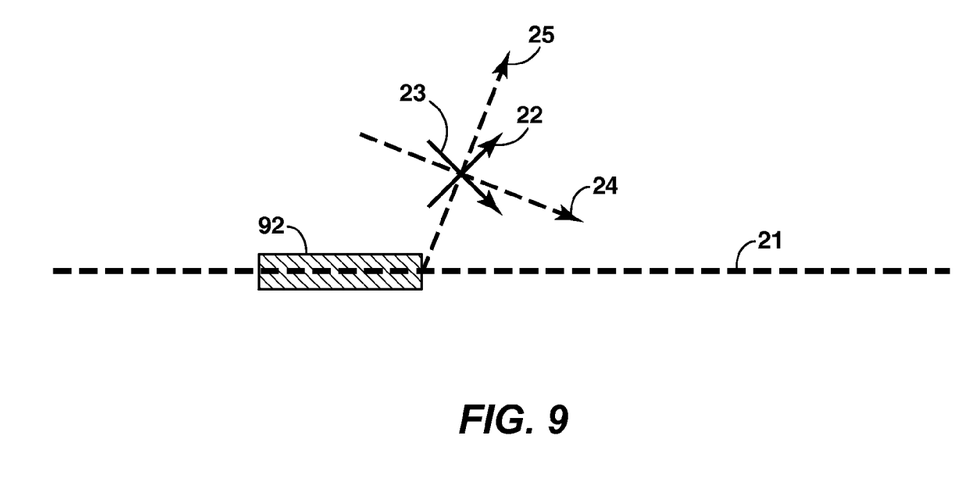

FIG. 9 illustrates situations where the matching of measured and synthetic data are appropriate. Data from offset range 92 corresponding to tow line 21 and synthetic receiver components (24, 25) are compared to measured receiver components (22, 23). A minimum of two synthetic data components are required in order to predict either measured component. Synthetic data components 24 and 25 need not be perpendicular, so long as they are not parallel. If the measured data components are believed to be tilted out of the horizontal plane, three synthetic components will preferably be used to predict any one measured component—the third synthetic component being generally perpendicular to components 24 and 25. The third synthetic component need not be strictly perpendicular to components 24 and 25 so long as it does not lie in the same plane as 24 and 25. In the second embodiment of the invention, synthetic data are projected along either or both measured components and the angle α varied until the projected data match the synthetic data sufficiently accurately.

In the second embodiment of the invention, the selected offset ranges are thus offset range 92 for tow line 21 and one of the measured components (22 or 23) and the same offset range 92 for tow line 21 and one of the projected components generated from synthetic components 24 and 25 or, more generally, from three synthetic components.

Figure 7A:
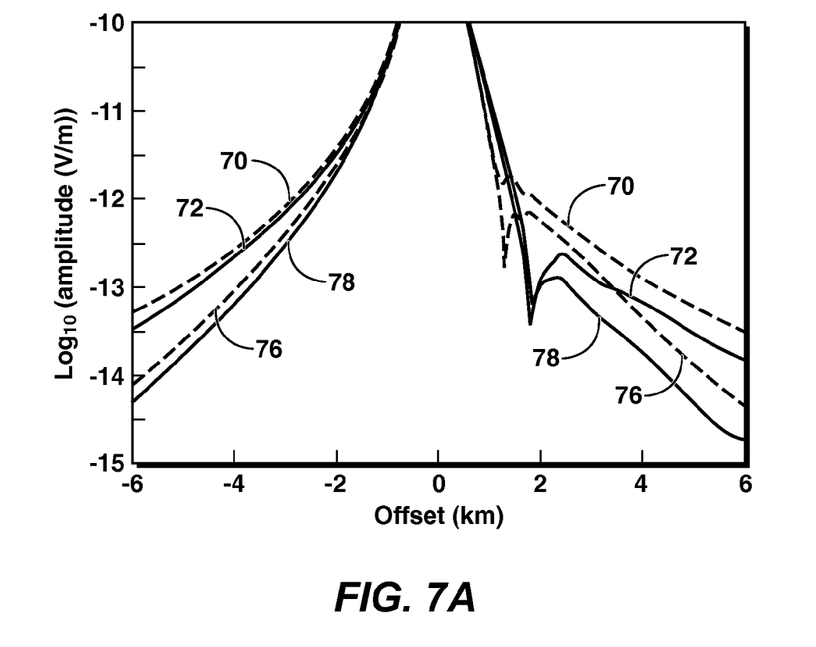
FIGS. 7A-B compare results of the present inventive method for one horizontal electric field components.
Figure 7B:
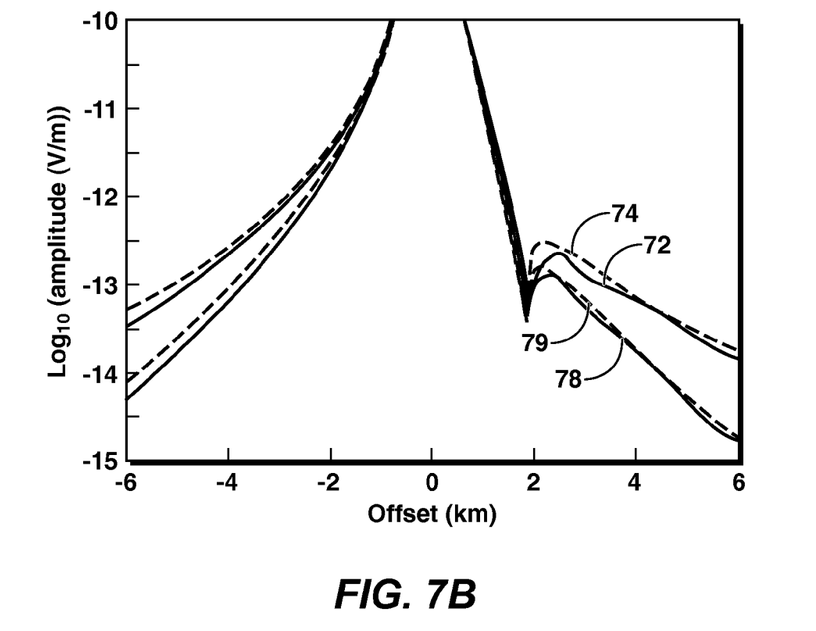

FIGS. 7A and 7B illustrate the use of the inventive method in this context. Data component 72 measured at 0.125 Hz is to be compared to component 70, generated from two synthetic components, such as (24, 25) measured at the same frequency. The orientation of 72 was believed from polarization analysis to be 273°. Resolving the synthetic components along an angle of 281°, however, resulted in the projected component 74 shown in FIG. 7B. The close match between 72 and 74 indicates that 281° is a far more accurate value for the orientation of the measured component. This orientation is further verified by comparing component 78 measured at 0.5 Hz to component 76 resolved along 273° from synthetic components and measured component 78 to component 79 resolved along 281° from synthetic components.

Mittet et al. ("E020: Inversion of SBL data acquired in shallow waters," EAGE 66th Converence & Exhibition—Paris, France, Jun. 7-10, 2004) and Lu (PCT Patent Application Publication WO 2007/018810) discuss the use of inversion to match synthetic to measured data and thereby determine receiver orientations. The second embodiment of the invention could also be performed using inversion, i.e. multiple forward-modeled solving of Maxwell's equations, to iteratively adjust the orientation angles for the synthetic data until a match with measured data is achieved. Instead, the second embodiment of the invention is performed by varying the results of a single forward-modeled simulation by trial-and-error projections of the results of that single simulation on to coordinate systems with different rotation (angular orientation) until a match is reached. The second embodiment has certain advantages over the inversion techniques described by Lu and by Mittet et al:

The sharp discontinuities in measured data 72 and 78 (corresponding to phase reversals in the measured data that are not shown) can give rise to multiple local minima in the inversion objective function, causing the inversion algorithm to find an orientation that is less than optimal.

Noise, not shown in FIGS. 7A-B, will likewise create spurious local minima in the inversion objective function, decreasing the chance of finding an improved orientation.

Knowing only the initial data, it is difficult to predict in advance which frequencies and offset ranges 92 will be most effective at determining a new orientation angle. In the second embodiment of the invention however, particularly when controlled manually by the user, it is very easy to adjust the orientation and evaluate the sensitivity of different frequencies and offset ranges to orientation and thereby discard data offset ranges and frequencies with a less than perfect match—such as synthetic data that may be responding to three-dimensional structure not found in the earth model.

The second embodiment of the invention requires only a single simulation of each synthetic component versus the repeated simulations and adjustments that are part of an inversion loop.

The second embodiment of the invention provides a simple means of dealing with missing data, since the method can be practiced with as little as one measured data component. At the other extreme, the manual method can be applied simultaneously to multiple measured components and/or multiple offset ranges. If multiple components are used, they may span different offset ranges, for example, due to different signal-to-noise levels.

The second embodiment of the invention is therefore to be preferred over inversion methods such as Lu and Mittet.

If vertical data components are also available, the three-dimensional orientation of the receiver can be refined by the same method through the use of equations (4).

The two embodiments can be practiced sequentially, in which the receiver orientation derived from the first embodiment can provide an initial estimate of the orientation which is subsequently refined by the method of the second embodiment. This two-step approach can improve the reliability of receiver orientations in the presence of three-dimensional geologic variations and transmitter antenna feathering (lateral and angular displacement of the transmitter antenna relative to the tow line).

When multiple broadside tow lines are present, their data can be examined individually or collectively during orientation analysis. Broadside tow lines with low signal-to-noise or showing evidence of complex geologic features that could upset the symmetry assumptions or be difficult to model may be ignored during the orientation analysis.

The flow chart of FIG. 4 shows basic method steps with sufficient generality to encompass both of the two example embodiments described above. In step 41, a survey receiver is selected. At step 42, one or more electromagnetic data components are selected. In the first embodiment of the invention, in-line and/or crossline (and optionally vertical) components are selected because they should possess the required matching symmetry. In the second embodiment, one or more measured components are typically selected. At step 43, a first data subset is selected; for example, an offset range where the data are considered reliable, of good quality, and undistorted. The selected data components for this offset range and receiver are thus chosen. At step 44, a second data subset is selected for which a match to the data from the first subset can be expected. In the first embodiment of the invention, the second subset is selected for its symmetry with the first subset with respect to source locations relative to the receiver location. Due to this symmetry, the data for corresponding source locations (same offset magnitude) should match the data from the first data subset after being resolved into inline and crossline components for a correct azimuth angle $\alpha$. An example of this is illustrated in FIG. 5 where the first data subset is data from offset range 51 and the second data subset is data from offset range 52. FIG. 8A shows two similarly situated symmetric offset ranges 81 and 82. In the second embodiment, the second data subset is a computer simulation of the first data subset, assuming a receiver azimuth angle value (and optionally other orientation angles). Either two or three synthetic components are needed to project to the measured direction following simulation. At step 45, an orientation is assumed for the selected receiver. This is necessary in order to (in the first embodiment) resolve measured EM data into inline, crossline and (optionally) vertical components using equations (1) or (4), or to simulate the first data subset in the second implementation as already explained in step 44. Then, at step 46, in the first embodiment, the inline and crossline (and vertical if the receivers have a third orthogonal antenna) components from the two data subsets are computed and compared for match. (The magnitudes—absolute values—of corresponding components are compared.) In the second embodiment, synthetic data are calculated using assumed receiver orientation angle or angles, and these are compared to the actual measured data. In either embodiment, if the match is not close enough to fall within a tolerance deemed acceptable, the assumed receiver orientation angle(s) is (are) adjusted to reduce the mismatch, and the necessary components are recomputed and compared again. This iteration may be repeated until the degree of mismatch is within the tolerance or another stopping condition is met. In the second embodiment, as stated, another simulation of the data is not necessary. The iteration instead involves adjusting the assumed orientation angles of the synthetic source antennas, then projecting the same synthetic components along the new direction or directions.

It can be seen that the present inventive method differs from prior approaches for at least the reason that neither online data (as in polarization analysis) nor knowledge of any reference receiver orientation (as in magnetotelluric coherency), nor iterative solution of a forward problem (as in inversion) is required. Advantages of the present invention include the fact that it exploits (rather than avoids) the sensitivity of offline data components to receiver orientation and, in the second embodiment, exploits knowledge of the seafloor topography and transmitter antenna feathering.

The present inventive method can be applied to both online and broadside data, and is more useful for broadside data. Broadside data have typically not been collected in many surveys and are deemed to be difficult to analyze and interpret. However, the broadside data are critical in determining anisotropic resistivity of the earth and more sensitive to the receiver orientation. The opinion that accurate measurements of anisotropy are important is not universally held within the industry, but this opinion appears to be gaining converts.

Certain preferred or optional embodiments of the invention will next be described in somewhat more detail, again in connection with the flow chart of FIG. 4.

Step 41: select a receiver to adjust the orientation.

All receivers in the survey are typically processed according to the invention, one by one. The orientation of each receiver in the survey is preferably first determined as well as can be done from more approximate methods. Readily available receiver orientation procedures such as polarization analysis may be applied first to provide an improved initial guess for the orientation correction of the present inventive method. The selected data are preferably from at least one tow line that is offline or broadside to the receiver, but online data may be used as well. The offline data are normally more sensitive to receiver orientation than the inline component of the online data. The cross-line component of the online data, which is proportional to the sin of the azimuth angle, is also very sensitive to the receiver orientation. However, this component is preferably ignored as it is usually very weak and, in fact, would vanish for a one-dimensional, layered earth.

Step 42: select data components.

Figure 6A:
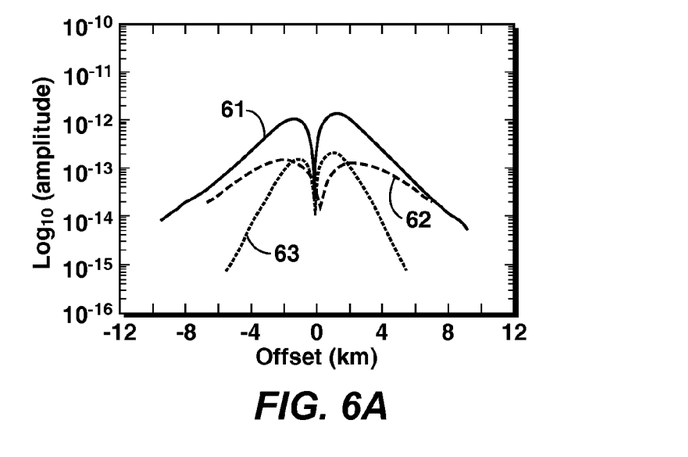
FIGS. 6A-B compare results of the present inventive method (6B) to results from polarization analysis (6A)
Figure 6B:
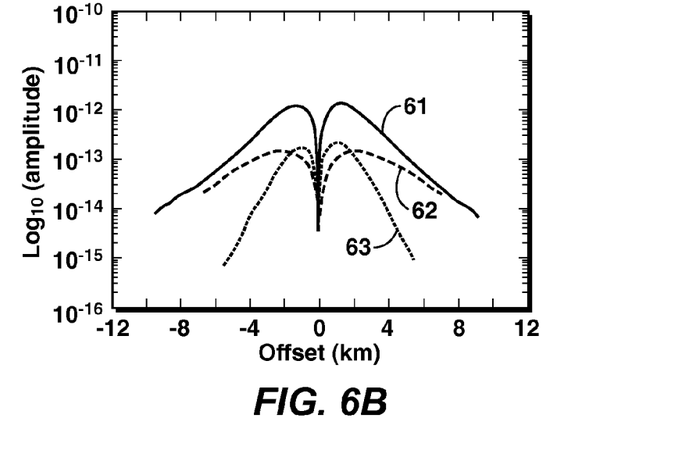

In the first embodiment of the invention, inline and crossline components of electric and/or magnetic field are used (data such as is shown in FIGS. 6A-B). These components are computed by the rotation from the measured horizontal field components. In the second embodiment of the invention, there is no need to resolve the measured data into components in any particular coordinate system, and measured horizontal components may be and typically are used. Alternatively, the vertical field component can be used either separately or together with horizontal components.

Step 43: select first data subset.

In both embodiments, only the measured data of good quality from the towlines near the receiver are typically considered. In the first embodiment, the first subset is the collection of one of the data symmetric offset ranges for each towline used (FIGS. 6A-B). In the second implementation, the first subset is typically measured data of a good quality from the towlines near the receiver used (FIGS. 7A-B). The data points for the subset on each towline are preferably selected by a skilled practitioner based on signal levels, tow line distance from the receiver and source frequency (after the measured data has been decomposed to the frequency domain, typically by Fourier transform).

Step 44: select second data subset.

In the first embodiment of the invention, the second subset is the measured data from the offset ranges on each towline symmetric to the first subset used (FIGS. 6A-B). In the second embodiment, the second subset is the synthetic data corresponding to the first data subset used (FIGS. 7A-B). To generate these synthetic data, a reasonable 3D resistivity model with all known geological information included (water depth, sea bottom bathymetry, and known geobodies) should preferably be created. 3D modeling software is required to accurately simulate the data components projected to the receiver antennae of a given initial receiver orientation. At least two of the horizontal antennae directions and more preferably three antennae directions are used in acquiring the synthetic data in order to carry out the synthetic antenna rotations for two field components as described in equation (2) and similarly for three field components to derive azimuth and tilt angles. Synthetic data along different trial receiver orientation are obtained by simply applying the corresponding data rotations. Also, those skilled in the art of electromagnetic data analysis will understand how source-receiver reciprocity may be used to minimize the computational effort of 3D modeling. Synthetic data from all towlines recorded by the same receiver can be obtained by one forward synthesis step.

Step 45: adjust receiver orientation to match components from the first and subsets.

In both embodiments, the receiver orientation is varied until the data from the first subset are approximately matched by the data from the second subset. In the second embodiment, it is preferred to rotate the synthetic data and to compare to the measured data in the form of the original separated channels (or antennae), even though one could rotate the measured data to compare to the synthetic data along a known orientation. The synthetic data along a trial receiver orientation can be obtained by rotating the synthetic data from the receiver orientation used in the forward simulation to the trial receiver orientation as described in Step 44 without performing an expensive forward synthesis at the new orientation. The synthetic data along the trial receiver antenna directions are compared to the measured data in the form of the original separated channels (or antennae). When the best match (step 46) between the measured and the rotated synthetic data is achieved, the trial receiver orientation of the synthetic data is the best estimate of the receiver orientation of the measured data. Multiple towlines (including online) and frequencies are preferably included in the subsets to insure consistency. In addition to amplitudes, the phases of the various measured and synthetic data components may also be compared.

In the first embodiment, the best match (i.e. most symmetry) should be achieved at the lowest available frequency. The data of higher frequencies could be considered as well for quality control. The data from the nearest towlines posess more symmetry, but data of good quality from farther towlines may also be desirable at least for quality control.

The data comparison procedure at a trial receiver orientation could be automated by some mathematical measurements on the data similarity between the two subsets. Visual comparison by plotting the two subsets on the same plot are preferable, especially for the second implementation. A skilled practitioner in the field of electromagnetic data analysis can select a best match more reliably than an automated mathematical similarity measurement can for a number of reasons. The mathematical similarity measurement variation with trial receiver orientation is normally not monotonic. There may exist multiple deep cusps (see the cusp in FIG. 7) in the data. The match of those cusps may be judged more reliably by visual observation than by mathematical measurements.

The second embodiment can also be applied to a receiver with missing data components. For example, when only one of the two horizontal components is active, one can still determine the receiver orientation by matching the rotated synthetic data along one of the two trial horizontal antenna directions to the measured data in the live horizontal channel. The trial receiver orientation in the synthetic data generating the best match to the measured data is the best estimate of the receiver orientation of the measured data. Neither the polarization analysis method nor the first embodiment of the present invention can be used for this case.

EXAMPLES

The result of an example where the first embodiment of the present inventive method was used is shown in FIG. 6B. Crossline components of a broadside electric field are shown. The solid curves 61 are data at a frequency of 0.125 Hz from a tow line located 2.5 km from the receiver. The dashed curves 62 represent data at 0.125 Hz from a tow line 4.7 km from the receiver. The dotted curves 63 represent data at 1.25 Hz and tow line 2.5 km from the receiver. All curves in FIG. 6B reflect iteration to determine the best receiver orientation. FIG. 6A shows for comparison the same data resolved into the crossline direction using the orientation determined by polarization analysis. Thus, FIG. 6A represents a result from the present invention after an intelligent first guess at receiver orientation, whereas FIG. 6B shows the improvement after cycles of adjusting/updating of the orientation to better match the data. The improvement is demonstrated by positive offset ranges' being more symmetrical with negative offset ranges in FIG. 6B than in FIG. 6A, showing that the present inventive method has more accurately determined the azimuth angle $\alpha$ than has polarization analysis. The best match between positive and negative offsets in FIG. 6B are the curves 61 (0.125 Hz and 2.5 km), with curves 63 (1.25 Hz, 2.5 km) a close second. Data at all frequencies and towlines show improvement after correction of the receiver orientation. Typically, the objective is to arrive at a best value of receiver azimuth (and optionally other orientation angles), but lower frequencies and farther offsets may be selectively discounted if they seem inconsistent with higher frequencies and shorter offsets, with the discrepancies attributed to 3D effects.

Test results for the second embodiment of the present inventive method are shown in FIGS. 7A-B. In these drawings, the comparison to make, instead of symmetry about the zero offset line, is between measured data (the solid line curves 72 and 78) and the computer simulation of the measured data (dashed curves 70, 76, 74 and 79). FIG. 7A shows this comparison for one measured horizontal component of the electric field, where the simulated field components are computed using an orientation angle determined from polarization analysis. The upper curves (70 and 72) are for a source frequency of 0.125 Hz, and the lower curves (76 and 78) are for 0.5 Hz. FIG. 7B shows the same measured component (and same two frequencies) and the simulated field components projected to the new orientation determined from the present inventive method. The starting estimates from polarization analysis, 70 and 76, have been adjusted to 74 and 79, respectively, by the second embodiment of the present invention. The simulated, projected data fit much better after correction of the receiver orientation, i.e. the simulated data match the measured data much better in FIG. 7B than in FIG. 7A.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for determining the orientation of a directional electromagnetic receiver used in a controlled source electromagnetic survey from the electromagnetic field data measured by the receiver in the survey, hereinafter called "survey data," said method comprising:
    (a) selecting a first offset range of said survey data, wherein "offset" means source-receiver separation;
    (b) selecting a second offset range of directional electromagnetic data;
    (c) assuming an angular orientation for the receiver relative to a selected coordinate reference frame;

(d) using the assumed angular orientation, resolving first offset range data from (a) and second offset range data from (b) into components in a common coordinate reference frame (the "projected components");

(e) comparing at least one projected component from the first offset range to a corresponding at least one projected component from the second offset range for degree of mismatch;

(f) adjusting the assumed angular orientation to reduce the degree of mismatch; and (g) repeating steps (d)-(f) until the degree of mismatch is reduced to less than a pre-selected tolerance or other stopping condition is met.

2. The method of claim 1, wherein said second offset range of electromagnetic data is obtained from said survey data, said second offset range being selected to be symmetric to said first offset range with respect to the receiver's location, and wherein the common coordinate reference frame includes inline and crossline axes.

3. The method of claim 2, wherein the selected coordinate reference frame also includes inline and crossline axes.

4. The method of claim 1, wherein said second offset range is the same as said first offset range, and said electromagnetic data in (b) is synthetic data generated to simulate the survey's conditions and in particular to generate synthetic data for said receiver in the survey for the first offset range.

5. The method of claim 4, wherein said common coordinate reference frame in (d) is aligned with the receiver's antenna directions.

6. The method of claim 5, wherein the selected coordinate reference frame includes inline and crossline axes.

7. The method of claim 1, wherein receiver orientation is determined by any of one, two, or three orientation angles.

8. The method of claim 1, further comprising transforming the survey data to frequency domain and performing steps (a)-(g) for a selected frequency component of the survey data.

9. The method of claim 1, wherein the first and second offset ranges of said survey data correspond to a source tow line broadside to the receiver and closer to the receiver than any other broadside tow line.

10. The method of claim 1, wherein the comparison in (e) is performed by visual inspection of a data display.

11. A computer program, containing machine-readable instructions, capable of executing the steps of claim 1, which is incorporated herein by reference.

12. A computer, programmed to execute the computer program of claim 11.

13. A method for producing hydrocarbons from a subsurface region, comprising:

(a) obtaining measured electromagnetic data from a controlled source electromagnetic survey of the subsurface region;

(b) obtaining processed electromagnetic data for the survey, wherein survey receiver orientation is estimated by a method described in claim 1, a copy of which is incorporated herein by reference;

(c) predicting hydrocarbon potential for the subsurface region based at least in part on the processed electromagnetic data; and (d) in response to a positive prediction of hydrocarbon potential, drilling a well into the subsurface region and producing hydrocarbons.

14. A method for determining the orientation of an electromagnetic receiver used in a controlled source electromagnetic survey from the electromagnetic field data measured by the receiver in the survey, hereinafter called "survey data," said method comprising:

(a) selecting a first offset range of said survey data;

(b) selecting a second offset range of said survey data, said second offset range being selected to be symmetric to said first offset range with respect to the receiver's location;

(c) forming a data component from said first offset range corresponding to an assumed receiver orientation, said data component being either an inline component, a crossline component or a vertical component;

(d) forming the same data component from said second offset range corresponding to the same receiver orientation as in (c);

(e) comparing the data component from the first offset range to the data component from the second offset range for degree of mismatch;

(f) adjusting said receiver orientation to reduce the mismatch in (e); and, (g) repeating steps (c)-(f) until said degree of mismatch is reduced to less than a pre-selected tolerance or other stopping condition is met.

15. A method for determining the orientation of a directional electromagnetic receiver used in a controlled source electromagnetic survey from the electromagnetic field data measured by the receiver in the survey, hereinafter called "survey data," said method comprising:

(a) selecting an offset range of said survey data;

(b) generating synthetic data by computer to simulate the survey's conditions and in particular to generate synthetic data for said receiver in the survey for the selected offset range;

(c) assuming an angular orientation for the survey receiver's antenna directions relative to the computer simulation's assumed receiver antenna directions;

(d) projecting a component of the selected offset range of survey data and a corresponding component of the synthetic data from (b) on to a common coordinate reference frame using the assumed angular orientation, and then comparing the survey data component to the synthetic data component for degree of mismatch;

(e) adjusting the assumed receiver angular orientation to reduce the mismatch; and, (f) repeating steps (d)-(e) until said degree of mismatch is reduced to less than a pre-selected tolerance or other stopping condition is met.

* * * * *